US 9,501,386 B2

(12) United States Patent
Lamego et al.

(10) Patent No.: US 9,501,386 B2
(45) Date of Patent: Nov. 22, 2016

(54) SYSTEM TESTING USING NESTED TRANSACTIONS

(71) Applicant: Microsoft Technology Licensing, LLC, Redmond, WA (US)

(72) Inventors: Andre Filipe Pires de Carvalho D Aquino Lamego Lamego, Copenhagen (DK); Alex Prodan, Redmond, WA (US); Soren Lindegaard Grubov, Lyngby (DK); Zhonghua Chu, Redmond, WA (US); Joshua H. Lange, Seattle, WA (US); Bastiaan Stephan Graaf, Frederiksberg (DK)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/583,360

(22) Filed: Dec. 26, 2014

(65) Prior Publication Data

US 2016/0188447 A1   Jun. 30, 2016

(51) Int. Cl.
*G06F 9/44* (2006.01)
*G06F 11/36* (2006.01)
*G06F 11/14* (2006.01)

(52) U.S. Cl.
CPC ....... *G06F 11/3672* (2013.01); *G06F 11/1458* (2013.01); *G06F 11/3688* (2013.01); *G06F 2201/84* (2013.01)

(58) Field of Classification Search
CPC ...................................... G06F 11/36–11/3696
USPC ................................................ 717/124–131
See application file for complete search history.

(56) References Cited

U.S. PATENT DOCUMENTS

| 5,870,758 | A * | 2/1999 | Bamford | G06F 17/30362 |
| 6,185,577 | B1 * | 2/2001 | Nainani | G06F 11/1471 |
| 6,816,873 | B2 * | 11/2004 | Cotner | G06F 11/1474 |
| 6,920,461 | B2 * | 7/2005 | Hejlsberg | G06F 9/46 |
| 7,103,597 | B2 * | 9/2006 | McGoveran | G06F 11/1474 |
| 7,185,005 | B1 * | 2/2007 | Long | H04L 29/06 |
| 7,188,124 | B2 * | 3/2007 | Huras | G06F 17/30595 |

(Continued)

FOREIGN PATENT DOCUMENTS

| CN | 101794247 A | 8/2010 |
| WO | 2014026611 A1 | 2/2014 |

OTHER PUBLICATIONS

Systematic Testing Using Test Summaries: Effective and Efficient Testing of Relational Applications—Shadi Abdul Khalek,—The University of Texas at Austin—Dec. 2011.*

(Continued)

*Primary Examiner* — Francisco Aponte
(74) *Attorney, Agent, or Firm* — Thomas Marquis; Kate Drakos; Micky Minhas

(57) ABSTRACT

A computer system includes a processor and a data store coupled to the processor. An application component is operably coupled to the processor and the data store and is configured to run one or more applications stored in the data store. A test framework is coupled to the processor and the data store and is configured to perform at least one test relative to a component of the computer system that interacts with a database. A savepoint manager is configured to responsively generate at least one savepoint in the database prior to the at least one test and to roll back the at least one savepoint after the at least one test. Methods of testing the computer system are also provided.

19 Claims, 9 Drawing Sheets

(56) References Cited

U.S. PATENT DOCUMENTS

| | | | |
|---|---|---|---|
| 7,231,397 B2* | 6/2007 | Madhavarapu | G06F 17/30227 |
| 7,305,422 B1* | 12/2007 | Wang | G06F 17/30309 |
| 7,539,999 B2* | 5/2009 | Cargille | G06F 9/466 |
| | | | 718/101 |
| 7,640,277 B2* | 12/2009 | Bird | G06F 17/30359 |
| 7,818,301 B2* | 10/2010 | Bird | G06F 17/30371 |
| | | | 707/674 |
| 7,904,434 B2 | 3/2011 | Yalamanchi et al. | |
| 8,060,780 B2* | 11/2011 | Weber | G06F 17/3051 |
| | | | 709/203 |
| 8,135,393 B2* | 3/2012 | Chen | G06F 8/65 |
| | | | 455/418 |
| 8,548,942 B2 | 10/2013 | Wong et al. | |
| 8,712,961 B2 | 4/2014 | Dwyer et al. | |
| 8,799,298 B2* | 8/2014 | Weissman | G06F 8/70 |
| | | | 707/755 |
| 9,071,553 B2* | 6/2015 | Ravichandran | G06Q 10/06 |
| 9,075,616 B2* | 7/2015 | Duggal | G06F 8/35 |
| 2002/0174108 A1* | 11/2002 | Cotner | G06F 11/1474 |
| 2005/0091502 A1* | 4/2005 | Cargille | G06F 9/468 |
| | | | 713/182 |
| 2005/0144593 A1* | 6/2005 | Raghuvir | G06F 11/3688 |
| | | | 717/124 |
| 2007/0078736 A1* | 4/2007 | Chand | G06Q 20/10 |
| | | | 705/35 |
| 2007/0174185 A1 | 7/2007 | McGoveran | |
| 2011/0161371 A1* | 6/2011 | Thomson | G06F 17/30398 |
| | | | 707/792 |
| 2011/0179142 A1* | 7/2011 | Ravichandran | G06Q 10/06 |
| | | | 709/218 |
| 2012/0016621 A1* | 1/2012 | Tan | G06F 11/3672 |
| | | | 702/122 |
| 2012/0323854 A1 | 12/2012 | Schreter | |
| 2013/0339704 A1* | 12/2013 | Greiner | G06F 9/3861 |
| | | | 712/244 |
| 2014/0164335 A1* | 6/2014 | Gnech | G06F 11/1456 |
| | | | 707/654 |
| 2014/0181793 A1* | 6/2014 | Kaliappan | G06F 11/3684 |
| | | | 717/124 |
| 2014/0258970 A1* | 9/2014 | Brown | G06F 8/47 |
| | | | 717/103 |

OTHER PUBLICATIONS

An Architecture for Nested Transaction Support on Standard Database Systems—Erik M. Boertjes, Paul W.P.J. Grefen, Jochem Vonk, Peter M.G. Apers-Center for Telematics and Information Technology University of Twente—2006.*

Unit testing database applications using SpecDB: A database of software specifications—Rana Farid Mikhail—University of South Florida—2006.*

Oracle® Database Application Developers Guide—Fundamentals 10g Release 2 (10.2)—Nov. 2005—Oracle.*

Recovery within Long-Running Transactions—Christian Colombo and Gordon J. Pace, University of Malta—ACM Computing Surveys, vol. 45, No. 3, Article 28, Publication date: Jun. 2013.*

Efficiently Running Test Suites Using Abstract Undo Operations—Shadi Abdul Khalek and Sarfraz Khurshid—The University of Texas at Austin—2011 22nd IEEE International Symposium on Software Reliability Engineering.*

"Skybase". Retrieved on: Oct. 20, 2014, Available at: http://infocenter.sybase.com/archive/index.jsp?topic=/com.sybase.infocenter.dc00170.1260/html/iqapg/X100767.htm.

"Database Transactions". Published on: Feb. 2, 2014, Available at: https://docs.djangoproject.com/en/dev/topics/db/transactions/.

Kiringa, et al. "Expressing Transactions with Savepoints as Non-Markovian Theories of Actions", In Proceedings of 10th International Workshop on Knowledge Representation meets Databases, Sep. 15, 2003, 12 pages.

* cited by examiner

SYSTEM TESTING USING NESTED TRANSACTIONS

BACKGROUND

Computer systems are currently in wide use. Some computer systems are relatively large and may include, for instance, thousands of different forms (e.g. electronic fillable documents) and other types of elements. Such computer systems are often customized (some heavily so) before they are deployed in a given implementation. Some large computer systems may include many thousands of different forms, each of which may have different controls and other user interface elements. Some example systems also include execution logic as well as workflows that allow users to access the system and perform a set of activities, or tasks, in order to carry out their duties in conducting a particular operation.

When such a computer system is deployed in a specific environment, it is common for the system to be customized to meet the functional requirements of the particular end user. By way of example, different customers may wish to have different form controls on a given form that represents a particular entity. In addition, different customers may also wish to have different fields, execution logic, or other items on a particular report form. Thus, it can be seen that a given computer system may be highly customized so that it meets the requirements of a particular end user for which the system is implemented.

When the base system is authored (before it is customized) it may also include a number of different tests that can be run to determine whether the system is working properly. Additionally, as a developer customizes or continues to develop on the base system, the developer may generate additional tests as well. Further, once the development is complete, it is also important to ensure that a system is functioning properly even when it is live and handling real data.

The discussion above is merely provided for general background information and is not intended to be used as an aid in determining the scope of the claimed subject matter.

SUMMARY

A computer system includes a processor and a data store coupled to the processor. An application component is operably coupled to the processor and the data store and is configured to run one or more applications stored in the data store. A test framework is coupled to the processor and the data store and is configured to perform at least one test relative to a component of the computer system that interacts with a database. A savepoint manager is configured to responsively generate at least one savepoint in the database prior to the at least one test and to roll back the at least one savepoint after the at least one test. Methods of testing the computer system are also provided.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Testing a complex computer system has always been an important operation. Additionally, many of the tests executed upon a given computer system create traces or data in one or more databases of the system that can create conflicts to logic executing for other users or tenants at the same or subsequent time. System testing relative to database operations has generally used a database log in order to painstakingly reverse changes that were performed to the system during testing. The utilization of a database log to essentially undo such changes required significant time and created the potential locking of table rows or entire tables which could unduly impact the availability of the database for other users or tenants. Further, the process of undoing such operations was not resilient to timeouts or crashes. Thus, it was possible to leave test data behind and the state of the database could be corrupted.

Embodiments described below, generally leverage a database function known as savepoints in order to robustly and efficiently maintain system data during and after execution of testing processes. Savepoints are functions that are supported by a number of databases, such as SQL Server, available from Microsoft Corporation of Redmond, Wash.

In accordance with some embodiments, savepoints may be triggered or generated, in a "stacked" manner. When a sandboxed testing operation begins, a transaction is created in the database that will never get committed. At this point, all transaction invocations for the session owner are redirected through this specific database connection that is governed by savepoints. As the execution progresses and at specific times, markers are added to the database effectively "saving" a state. At the end of specific execution flow and to return to a previous state, the stack of savepoints is popped and the changes from that moment on are simply dismissed. When sandboxed testing is finished, the final savepoint is dismissed and the changes are reverted.

Figure 1:
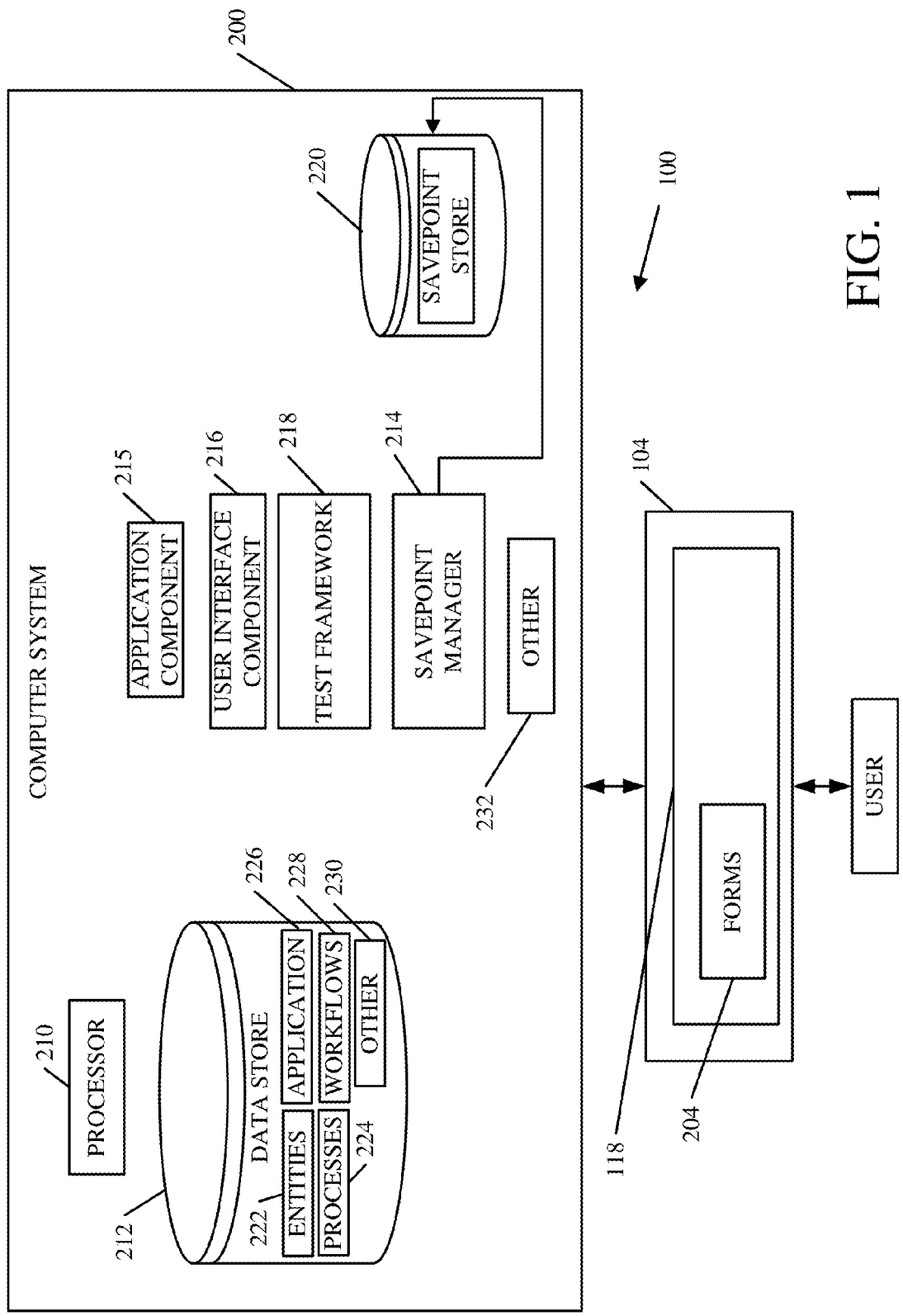
FIG. 1 is a diagrammatic view of a computer system in accordance with an embodiment.

FIG. 1 is a block diagram of a computer system environment 100 in accordance with an embodiment. Computer system 200 may be any suitable computer system that is generally provided as a base system and subsequently customized or otherwise developed prior to deployment. System 200 is shown generating user interface displays 118 that can include forms 204. System 200 may have thousands of different forms 204, each of which may have many controls.

The user interacts with user interface displays 118 in order to interact with, and manipulate, system 200.

System 200, in one example, includes processor(s) 210, data store 212, application component 215, user interface component 216 and test framework 218. System 200 can also include other components 232 as well. System 200 includes or is coupled to savepoint manager 214 that includes or is coupled to savepoint store 220.

Data store 212, in one embodiment, includes data entities 222, processes 224, applications 226, workflows 228 and other data records 230. Entities component 222, in one embodiment, describes entities within or otherwise used by system 200. Data store 212 may also include one or more databases that implement the savepoint operation. However, embodiments can be practiced where the database is remote from system 200 and communicatively coupled to system 200 through any suitable communication media.

Applications 226 can be any suitable applications that may be executed by system 200 in order to perform one or more functions for which system 200 is deployed. Application component 215, in one example, runs applications 226, which can include processes 224 and workflows 228. Processes 224 and workflows 228, in one example, operate upon data entities 222 as well as other records 230 in order to enable the user to perform his or her operations within system 200. In one example, user interface component 216, either by itself, or under the control of other items in system 200, generates user interface displays 118.

Figure 2:
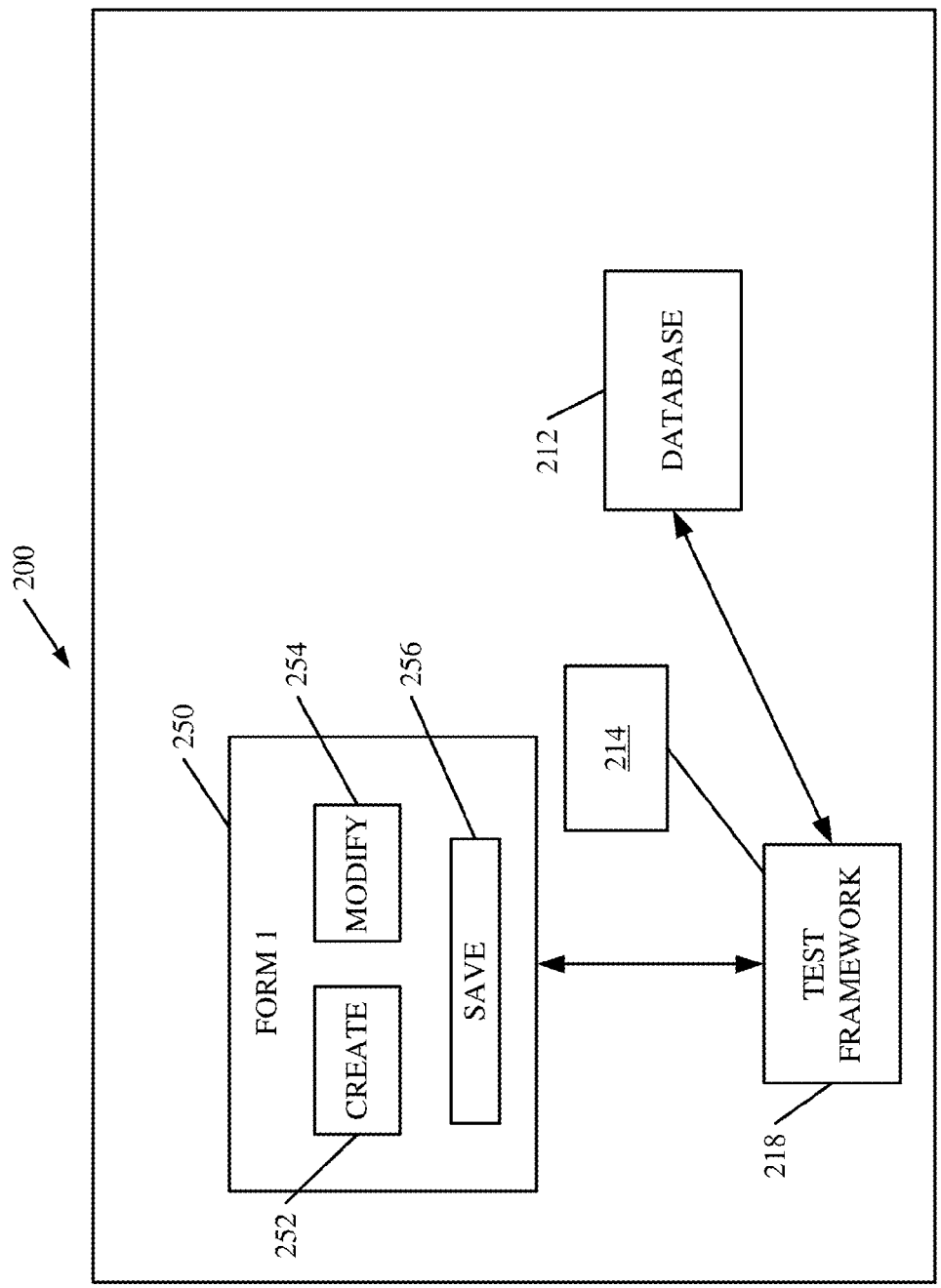
FIG. 2 is a diagrammatic view of a computer system testing a form that interacts with a database in accordance with an embodiment.

FIG. 2 is a diagrammatic view of system 200 performing testing relative to Form 1, indicated at reference numeral 250. In order to test Form 1, test framework 218 invokes an instance of the form and interacts with various user interface elements on the form, such as "Create" user interface element 252, "Modify" user interface element 254, and "Save" user interface element 256. As set forth above, forms are used by the system in order to allow a user to interact with data and other processes available from the system. Test framework 218, using an instance of form 250 is able to modify data within data store 212. Prior to testing form 250, test framework 218 utilizes savepoint manager 214 to create a savepoint relative to data store 212. Then, test framework 218 may perform one or a number of test operations that actually modify production data within data store 212. This allows the testing function to be performed very effectively since real-world data and loads are accurately simulated during testing. Once the testing operation is complete, test framework 218 again engages savepoint manager 214 to roll back the savepoint that was created prior to the testing. Thus, any changes that occurred to the data in data store 212 during testing of the form are precisely and efficiently rolled back.

Figure 3:
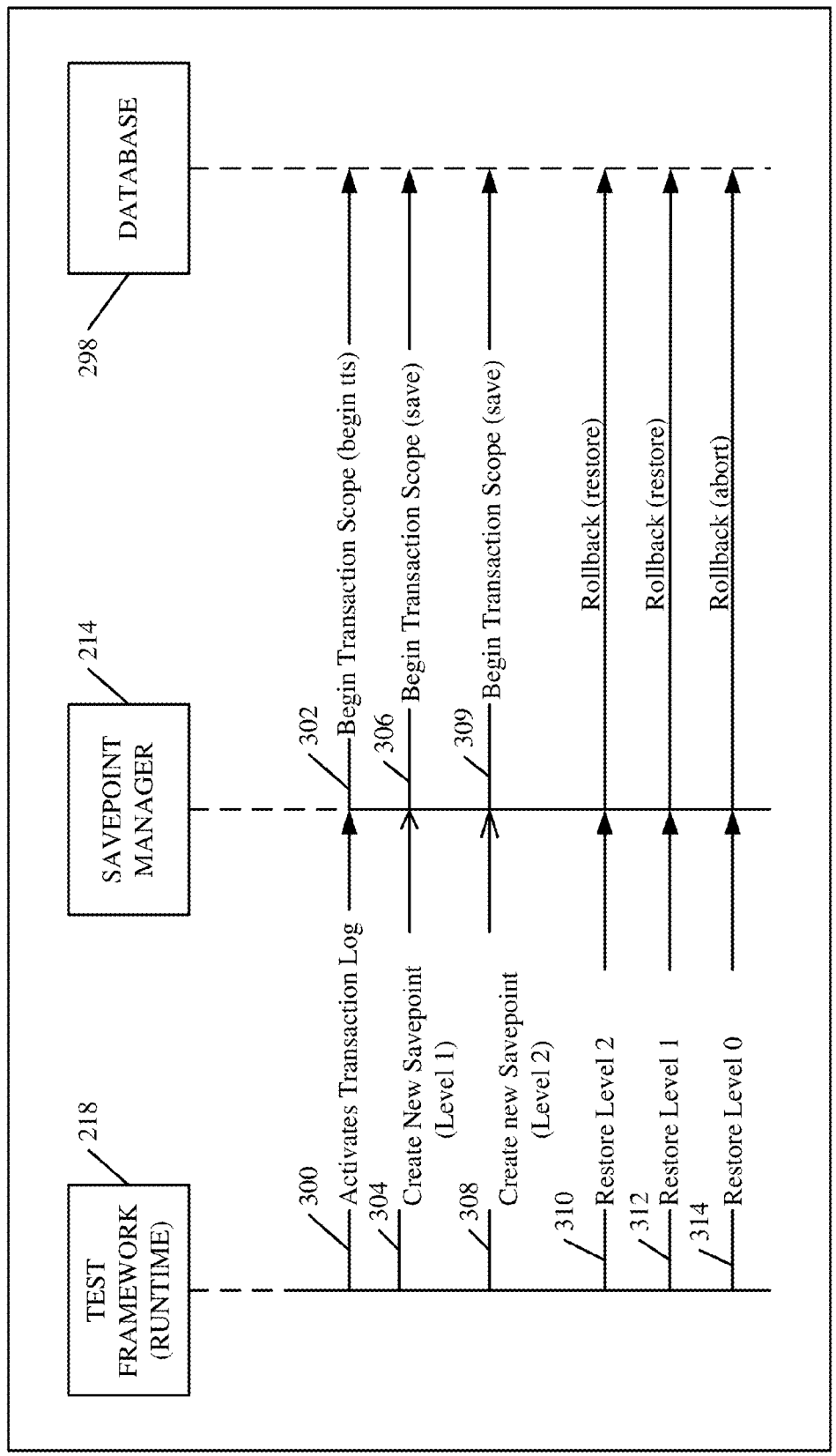
FIG. 3 is a swim lane diagram indicating savepoint execution in accordance an embodiment.

FIG. 3 is a swim lane diagram of savepoint use in system testing in accordance with an embodiment. As shown in FIG. 3, test framework 218 initially makes a call to savepoint manager 214 in order to activate a transaction log, as indicated a reference numeral 300. This causes savepoint manager 214 to begin a transaction with database 298. Database 298 may be a component of data store 212, a separate component of system 200 or it may be a remote database that is communicatively coupled to system 200.

As indicated at reference numeral 302, savepoint manager 214 initiates a transaction with database 298 labeled "Begin Transaction Scope." Test framework 218 then commands savepoint manager 214 to create a first (Level 1) savepoint. This causes savepoint manager 214 to responsively invoke a savepoint command on database 298, as indicated reference numeral 306. Subsequently, test framework 218 commands savepoint manager 214 to create a second (Level 2) savepoint, as indicated at reference numeral 308. This causes savepoint manager 214 to responsively invoke another savepoint command on database 298, as indicated reference numeral 309. Testing is performed after creation of the savepoints as will be described in greater detail below with respect to FIG. 4. Once the testing is complete, the associated changes to the data in database 298 are undone by rolling back the respective save points, as indicated by test framework 218 issuing restore commands to savepoint manager 214. In the example shown, this includes test framework 218 issuing a "Restore Level 2" command to savepoint manager 214, as indicated at reference numeral 310 followed by test framework 218 issuing Restore Level 1 to savepoint manager 214 as indicated at reference numeral 312. Finally, test framework 218 issues "Restore Level 0" to savepoint manager 214 as indicated at reference numeral 314. With each of these "Restore Level" commands being issued to savepoint manager 214, savepoint manager 214 executes a corresponding rollback command on database 298 in order to roll back the respective savepoint. Essentially, FIG. 3 illustrates that the savepoints can be nested and that they can be used to efficiently undo database operations performed during system testing.

Figure 4:
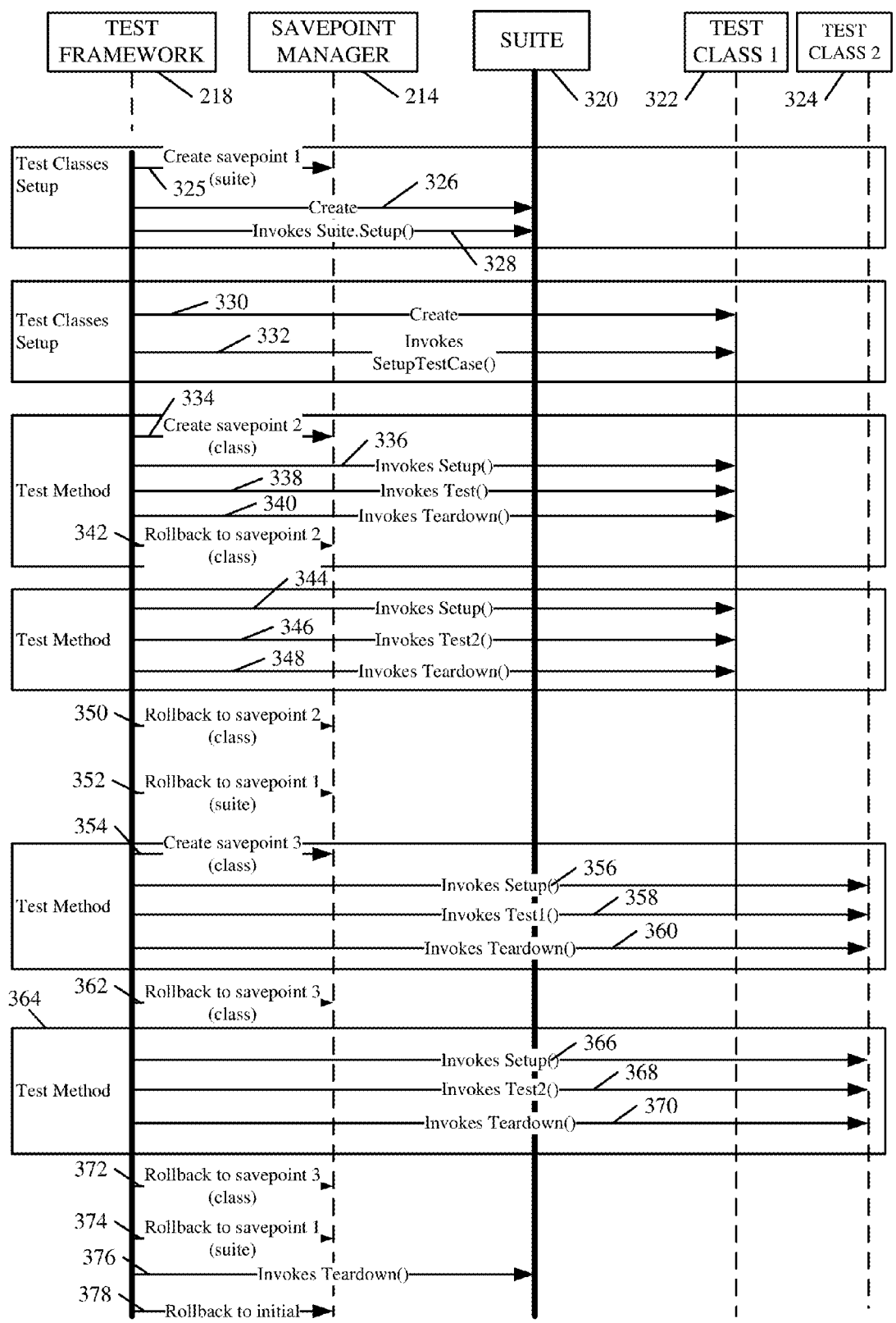
FIG. 4 is a swim lane diagram indicating testing of a computer system employing savepoints in accordance with an embodiment.

FIG. 4 is a swim lane diagram of system testing using savepoints in accordance with an embodiment. While FIG. 4 is somewhat similar to FIG. 3, FIG. 3 illustrates test framework operation and savepoint interaction relative to database 298, while FIG. 4 illustrates test framework and savepoint manager interaction relative to the application layer. The application layer includes suite 320 as well as Test Class 1, 322 and Test Class 2, 324. As illustrated in FIG. 4, testing initially begins with test framework 218 causing savepoint manager 214 to create savepoint 1, as indicated at reference numeral 325. As described above, with respect to FIG. 3, this causes savepoint manager 214 to interact with database 298 in order to create a savepoint. Next, as illustrated at reference numeral 326, test framework 218 issues a "Create" command to application suite 320. Subsequently, test framework 218 invokes the Suite.Setup function indicated at reference numeral 328 from test suite 320. Within the context of the invoked suite setup, test framework 218 begins testing of first test class 322 by issuing a Create command to test class 322 as indicated at reference numeral 330. Subsequently, test framework 218 invokes the SetupTestCase function for first test class 322 as indicated at reference numeral 332. Test framework 218 then utilizes savepoint manager 214 to create savepoint 2, as indicated at reference numeral 334. Next, test framework 218 invokes the setup of first test class 322, as indicated at reference numeral 336. Testing of first test class 322 is then performed by test framework 218 by invoking Test 1, as indicated at reference numeral 338. Test1 may perform one or more suitable testing functions relative first test class 322 in order to validate or otherwise diagnose the behavior of first test class 322 in the system. Once execution of Test1 is complete, test framework 218 invokes a teardown of first test class 322 as indicated at reference numeral 340. Then, test framework 218 rolls back to savepoint 2, as indicated at reference numeral 342. By rolling back to savepoint 2, all of the changes to the data or traces in database 298 caused by operation of Test1 are removed. Accordingly, database 298 will revert to the state that existed when savepoint 2 was created at reference numeral 334.

A second test method begins when test framework 218 again invokes the setup of first test class 322, as indicated at reference numeral 344. Then, at reference numeral 346, test framework 218 invokes Test2 on first test class 322. Finally, after Test2 has completed for first test class 322 test framework 218 invokes the teardown of first test class 322, as indicated at reference numeral 348.

Before testing second test class 324, test framework 218 causes savepoint manager 214 to roll back to savepoint 2, as indicated at reference numeral 350. As set forth above, with respect to FIG. 3, this causes savepoint manager 214 to execute a rollback operation relative to database 298. At reference numeral 352, test framework 218 causes savepoint manager 214 to roll back to savepoint 1, which was created initially at reference numeral 325. Once the rollback to savepoint 1 has been completed, all of the database operations that occurred during the testing of first test class 322 have been precisely and efficiently undone.

In order to begin testing second test class 324, test framework 218 causes savepoint manager 214 to create save point 3, as indicated at reference numeral 354. Then, test framework 218 invokes the setup function with respect to second test class 324, as indicated at reference numeral 356. Once the setup function has finished, Test1 is executed with respect to second test class 324, as indicated at reference numeral 358. Once Test1 of second test class 324 has completed, test framework 218 invokes the teardown of second test class 324, as indicated at reference numeral 360. Once the teardown function is completed, test framework 218 causes savepoint manager 214 to roll back to savepoint 3, as indicated at reference numeral 362 thereby returning database 298 to the condition that existed before savepoint 3 was created. Accordingly, the subsequent test method, indicated at reference numeral 364, can operate upon the precise database state as the previous test method.

In order to begin test method 364, test framework 218 again invokes the setup function of second test class 324 as indicated at reference numeral 366. Then, Test2 is performed relative to second test class 324, as indicated at reference numeral 368. Finally, when Test2 has completed, test framework 218 invokes the teardown of second test class 324, as indicated at reference numeral 370. Once Test2 of second test class 324 has completed, test framework 218 causes savepoint manager 214 to roll back to savepoint 3, as illustrated at reference numeral 372. Additionally, with the testing substantially complete, test framework 218 causes savepoint manager 214 to further roll back to save point 1, as indicated at reference numeral 374. With the rollback to save point 1 completed, test framework 218 causes test suite 320 to perform a teardown as indicated at reference numeral 376. Finally, test framework 218 causes savepoint manager 214 to roll back to the initial state as indicated at reference numeral 378. With this final rollback to the initial state, database 298 is returned to precisely the state it was in prior to testing. Thus, it can be appreciated that a sandboxed execution of logic for testing purposes using savepoints is provided.

The ability to make and use savepoints in the context of multi-tenant, multi-user, database-centric application testing is facilitated. The use of savepoints allows substantially instantaneous rollback of state for a specific session and by-design crashes (or connection timeout) support. The strategy used by savepoint isolation is to never commit the data changes but, instead, to create and make use of savepoints (markers in the database) which preserve, in memory, the state of the database for a particular connected session. Savepoints can be chained and nested as described with respect to FIGS. 3 and 4. This allows the controlling process to return to a prior state of the database without completely rolling back all of the changes. In the case of a crash or a connection timeout, the changes in data are simply dismissed leaving the database state intact.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks or swim lanes with functionality ascribed to each. It will be noted that fewer blocks or swim lanes can be used so the functionality is performed by fewer components. Also, more blocks or swim lanes can be used with the functionality distributed among more components.

Figure 5:
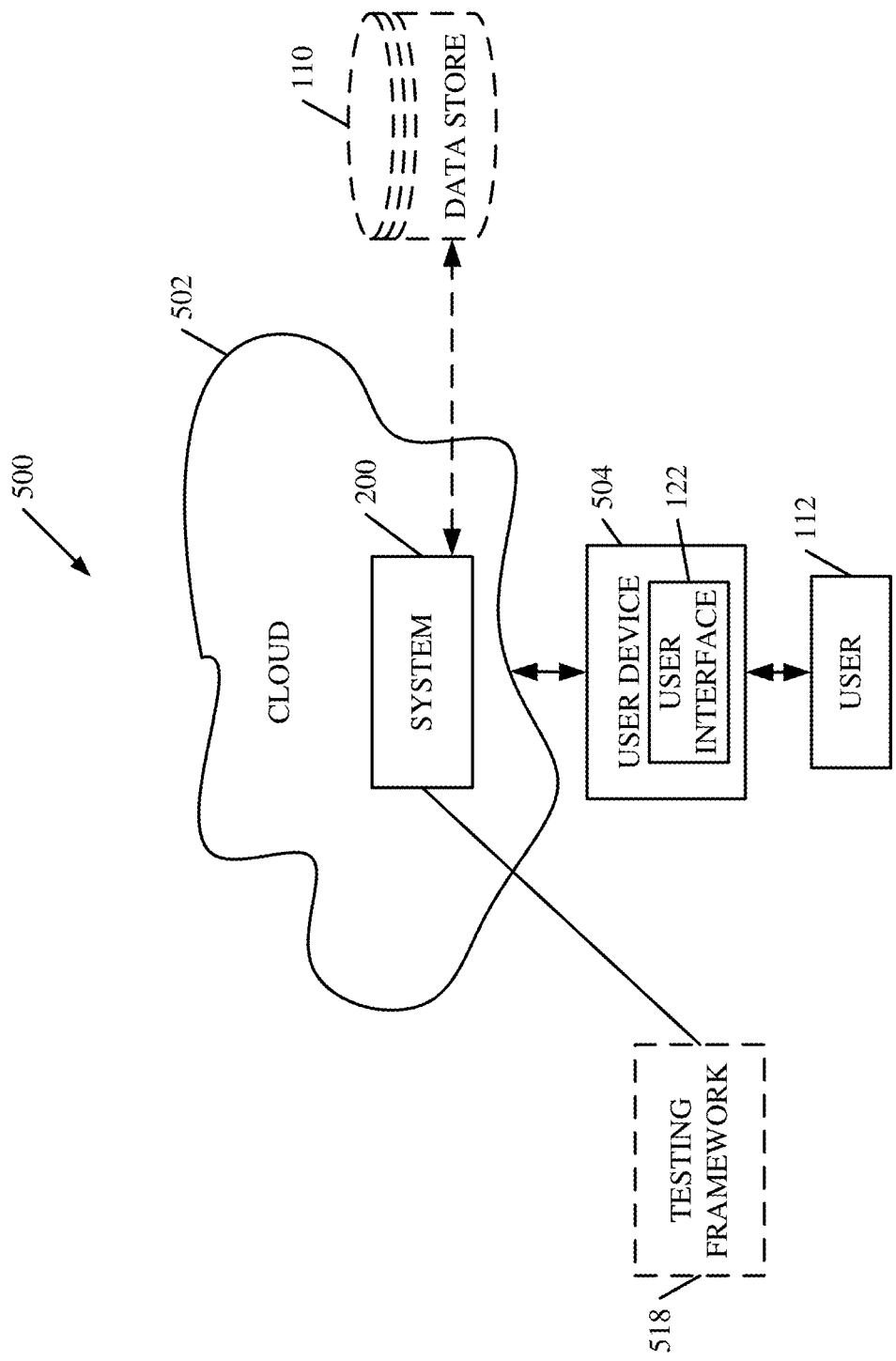
FIG. 5 is a block diagram of a testing architecture, shown in FIG. 1, except that at least some of its elements are disposed in a cloud computing architecture.

FIG. 5 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the embodiment shown in FIG. 5, some items are similar to those shown in FIG. 1 and they are similarly numbered. FIG. 5 specifically shows that 200 is located in cloud 502 (which can be public, private, or a combination where portions are public while others are private). Therefore, user 112 uses a user device 504 to access those systems through cloud 502.

FIG. 5 also depicts another embodiment of a cloud architecture. FIG. 5 shows that it is also contemplated that some elements of system 200 are located in cloud 502 while others are not. By way of example, data store 110 can be located outside of cloud 502, and accessed through cloud 502. In another embodiment, testing framework 518 is also located outside of cloud 502. Regardless of where they are located, they can be accessed directly by device 504, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 6:
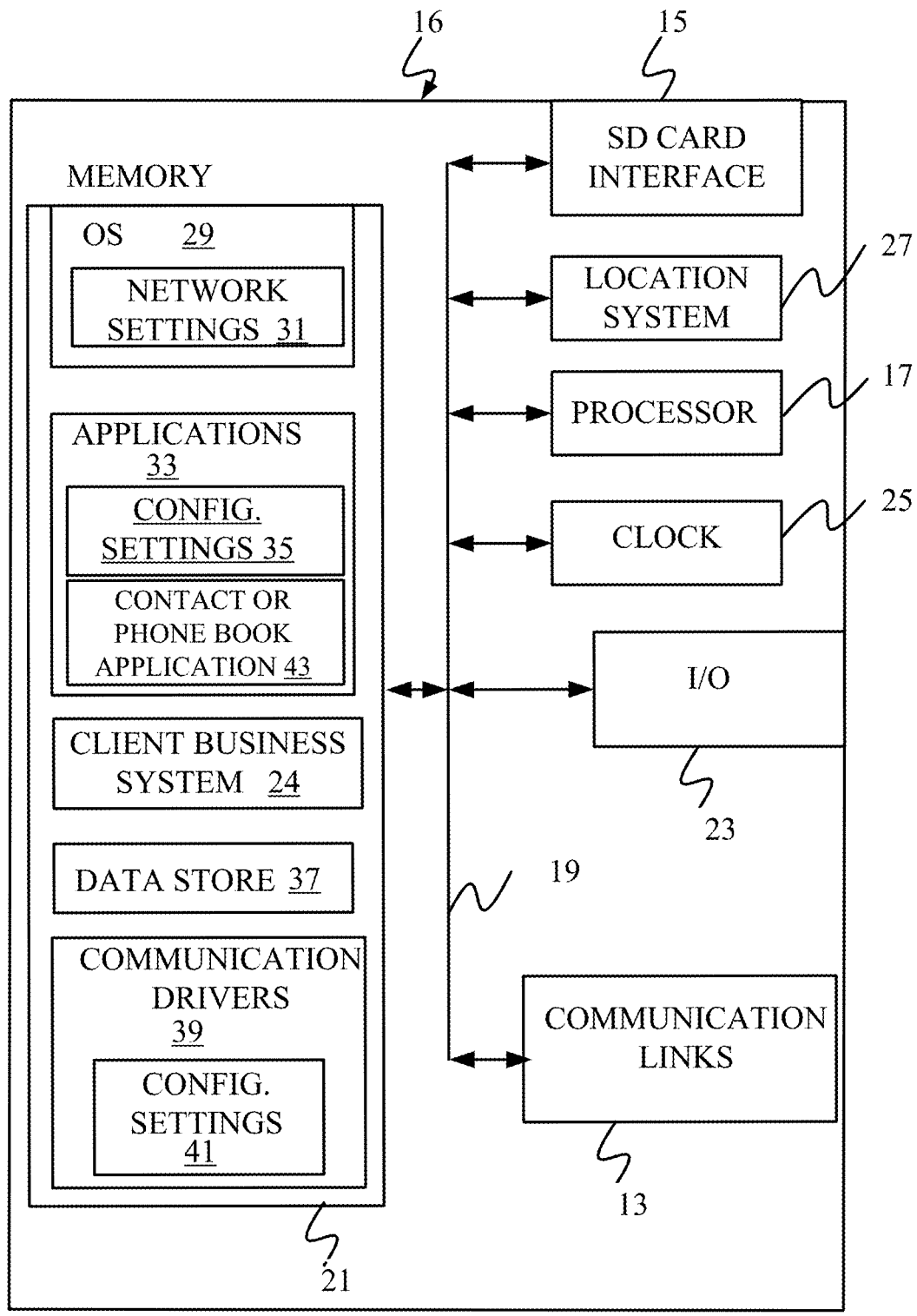
FIG. 6 is a simplified block diagram of one illustrative embodiment of a handheld or mobile computing device that can be used as a user's or client's hand held device, in which the present system (or parts of it) can be deployed.
Figure 7:
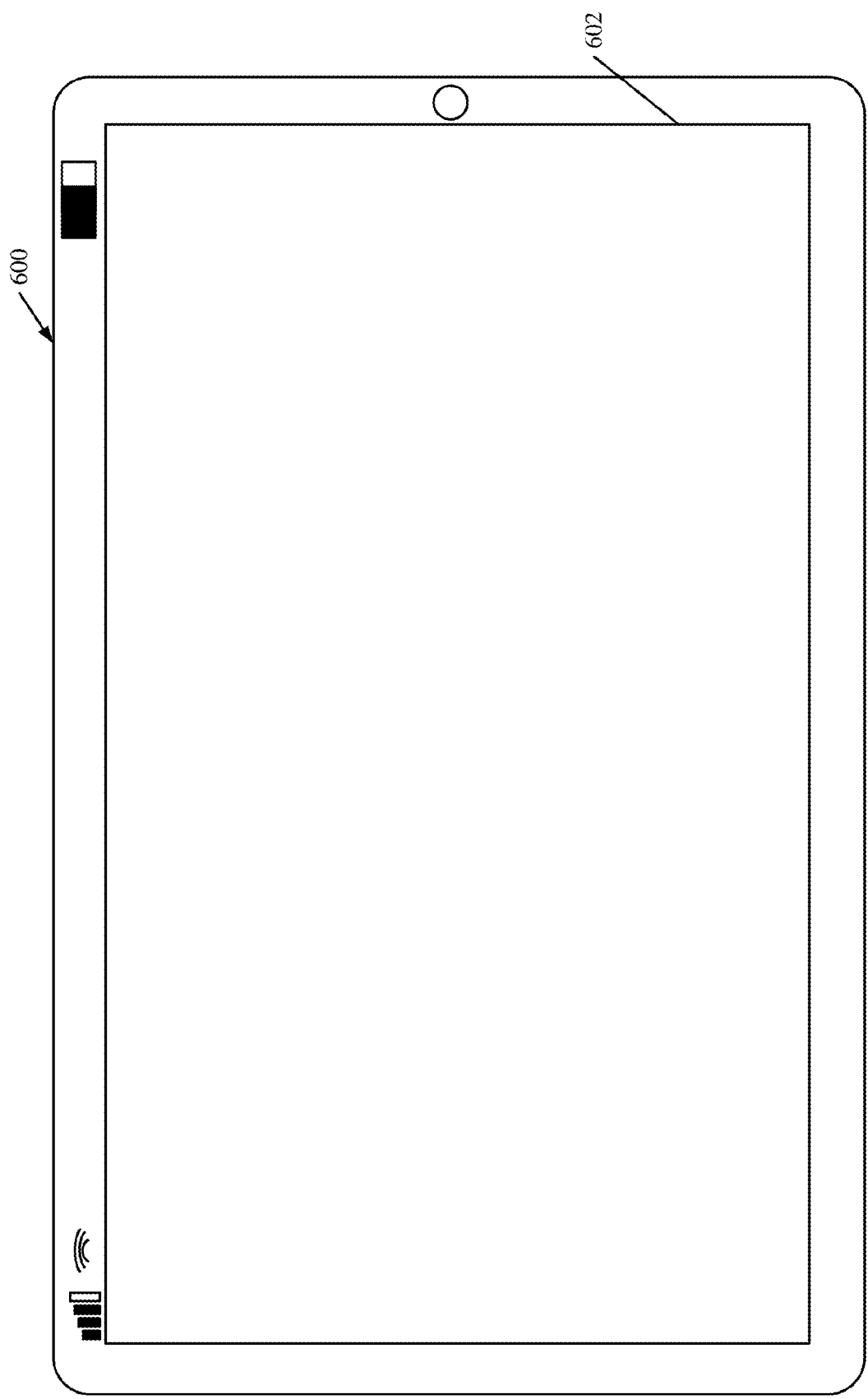
FIG. 7 is a diagrammatic view of a tablet computer that can be used as a user's mobile device.
Figure 8:
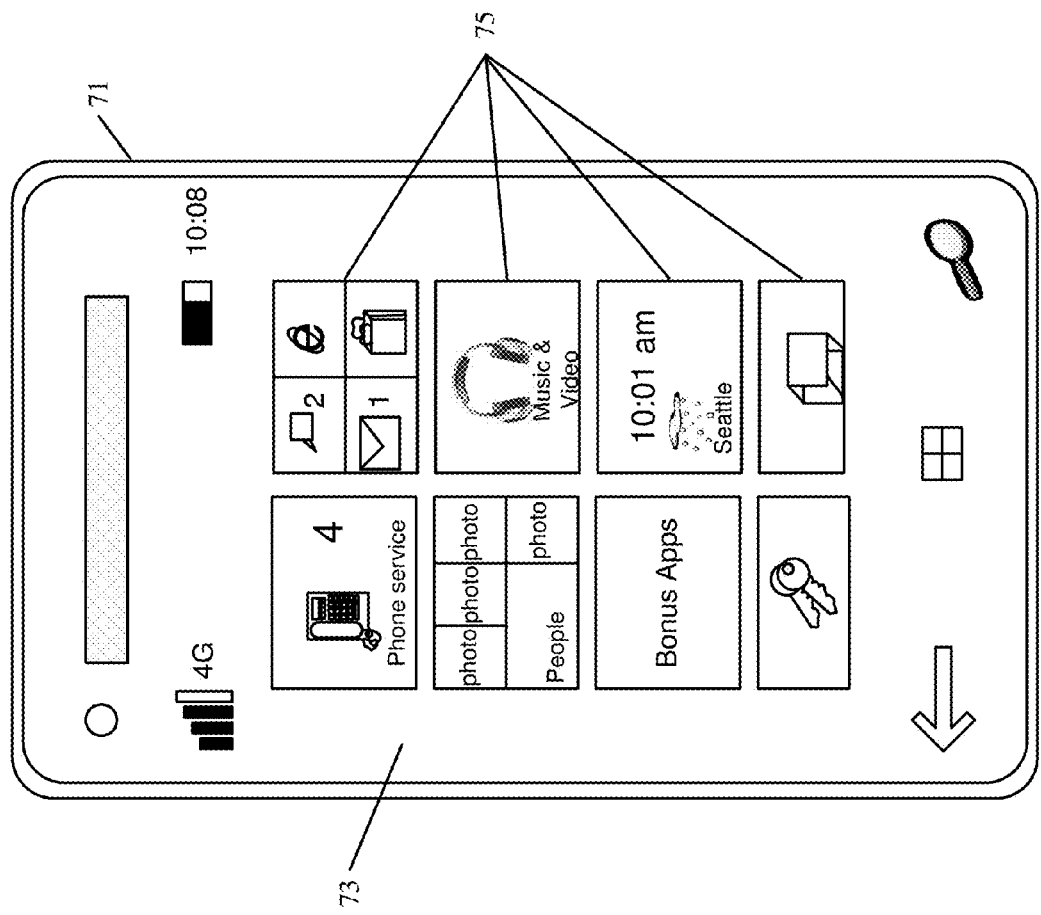
FIG. 8 is a diagrammatic view of smartphone that can be used as a user's mobile device.

FIG. 6 is a simplified block diagram of one illustrative embodiment of a handheld or mobile computing device that can be used as a user's or client's hand held device 16, in which the present system (or parts of it) can be deployed. FIGS. 7 and 8 are examples of handheld or mobile devices.

FIG. 6 provides a general block diagram of the components of a client device 16 that can run components of system 200 or that interacts with architecture 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1×rtt, and Short Message Service, which are wireless services used to provide cellular access to a network, as well as 802.11 and 802.11b (Wi-Fi) protocols, and Bluetooth protocol, which provide local wireless connections to networks.

Under other embodiments, applications or systems are received on a removable Secure Digital (SD) card that is connected to a SD card interface 15. SD card interface 15 and communication links 13 communicate with a processor 17 along bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Items in data store 212, for example, can reside in memory 21. Similarly, device 16 can have a client system 24 which can run various applications. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 7 shows one embodiment in which device 16 is a tablet computer 600. In FIG. 7, computer 600 is shown with a user interface displayed on the display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 8 provides an additional example of devices 16 that can be used, although others can be used as well. In the example shown in FIG. 8, the device is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 9:
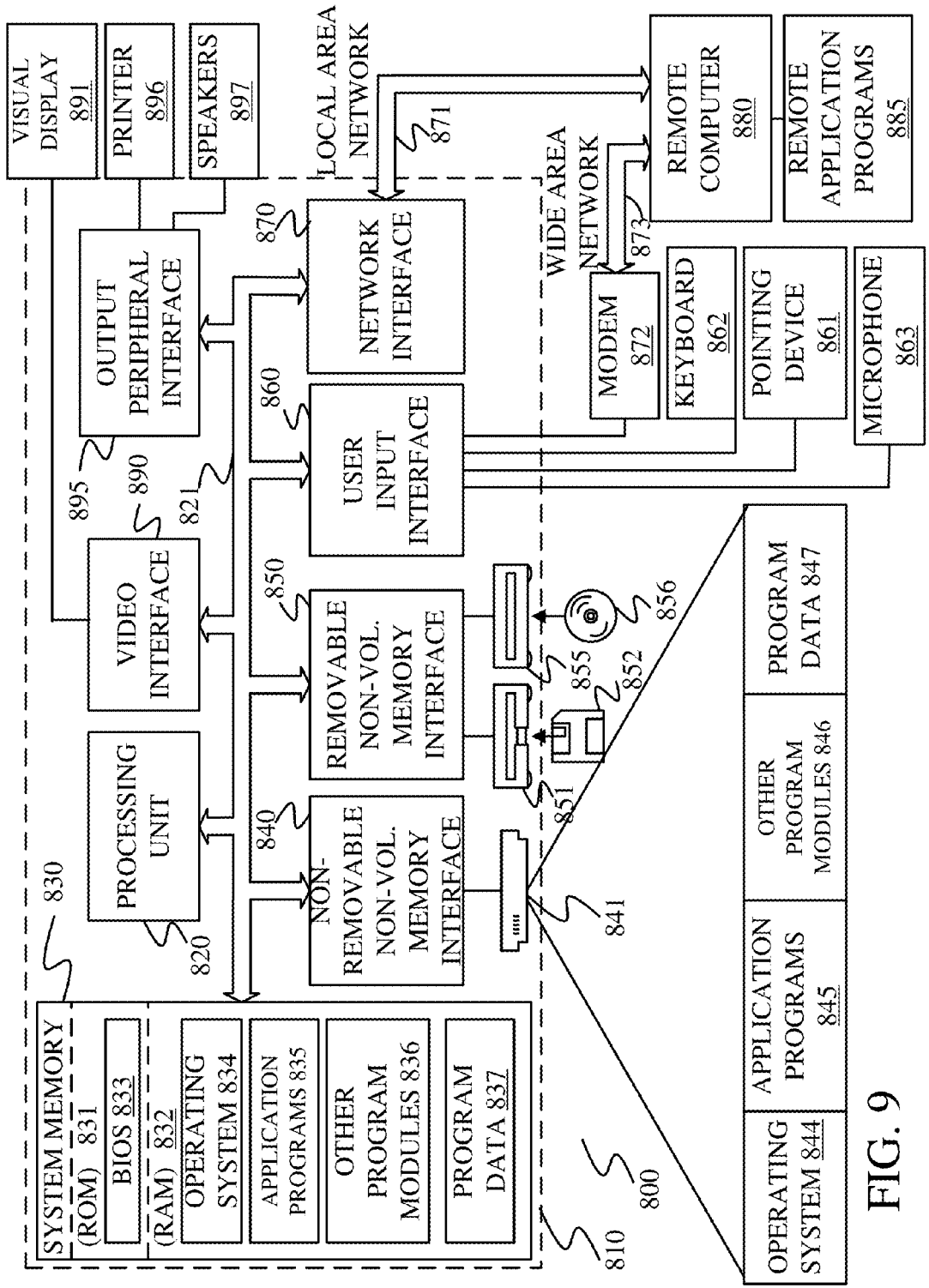
FIG. 9 is one embodiment of a computing environment in which architecture 100, or parts of it, (for example) can be deployed.

FIG. 9 is one embodiment of a computing environment in which architecture 100, or parts of it, (for example) can be deployed. With reference to FIG. 9, an exemplary system for implementing some embodiments includes a general-purpose computing device in the form of a computer 810. Components of computer 810 may include, but are not limited to, a processing unit 820, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 9.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 9 illustrates operating system 834, application programs 835, other program modules 836, and program data 837.

The computer 810 may also include other removable/non-removable volatile/nonvolatile computer storage media. By way of example only, FIG. 9 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 9, provide storage of computer readable instructions, data structures, program modules and other data for the computer 810. In FIG. 9, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 10 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 9 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer system comprising:
a processor;
a data store coupled to the processor;
an application component operably coupled to the processor and the data store, the application component being configured to run an application stored in the data store;
a test framework coupled to the processor and the data store, the test framework being configured to:
  set up a first test class,
  perform a test relative to a component of the computer system that interacts with a database,
  perform a teardown function of the first test class; and
a savepoint manager configured to responsively execute a savepoint function in the database prior to the test and to execute a rollback function of the savepoint function after the test.

2. The computer system of claim 1, wherein the database is a component of the computer system.

3. The computer system of claim 1, wherein the database is located remotely from the computer system and is communicatively coupled to the computer system.

4. The computer system of claim 1, wherein the component of the computer system is a user form.

5. The computer system of claim 1, wherein the component is a workflow.

6. The computer system of claim 1, wherein the component is a process.

7. The computer system of claim 1, and wherein the savepoint manager is configured to execute a plurality of savepoint functions and subsequently execute a rollback function relative to each executed savepoint function.

8. The computer system of claim 7, wherein the plurality of savepoint functions are nested.

9. The computer system of claim 8, wherein information relative to the nested savepoint functions is stored in a stack.

10. A computer-implemented test method comprising:
executing first and second savepoint functions in a database;
setting up a first test class;
performing a first system test after executing the first and second savepoint functions, wherein the first system test changes data in the database;
performing a teardown function of the first test class; and
executing a rollback function relative to one of the first and second savepoint functions after performing the first system test.

11. The computer-implemented test method of claim 10, wherein the first and second savepoint functions are nested.

12. The computer-implemented test method of claim 11, and further comprising performing a second system test after executing rollback function.

13. The computer-implemented test method of claim 12, and further comprising executing a rollback function relative to the other of the first and second savepoint functions after completion of the second system test.

14. The computer-implemented test method of claim 13, and further comprising executing a third savepoint after executing rollback functions relative to the first and second savepoint functions and performing a third system test after executing the third savepoint function.

15. The computer-implemented test method of claim 14, and further comprising executing a rollback function relative to the third savepoint function after completion of the third system test.

16. A computer-implemented test method comprising:
causing a test framework to execute a first savepoint function in a database using a savepoint manager;
initiating a setup function in an application component;
causing the test framework to execute a second savepoint function in the database using the savepoint manager;
setting up a first test class;
performing a first test function on the first test class;
causing the test framework to execute a rollback function relative to the second savepoint function using the savepoint manager; and
invoking a teardown function of the first test class prior to causing the test framework to execute a rollback function relative to the second savepoint.

17. The computer-implemented test method of claim 16, and further comprising performing a second test function on the first test class.

18. The computer-implemented method of claim 17, and further comprising executing rollback functions relative to the first and second savepoint functions.

19. The computer-implemented test method of claim 18, and further comprising:
causing the test framework to execute a third savepoint function in the database using the savepoint manager;
setting UP a second test class;
performing the first test function on the second test class; and
causing the test framework to execute a rollback function relative to the third savepoint function using the savepoint manager.

* * * * *